INVENTOR.
GASPARAS KAZLAUSKAS
BY
AGENT

July 30, 1968  G. KAZLAUSKAS  3,395,262
EXTERNAL WELD HEAD

Filed Sept. 30, 1964  2 Sheets-Sheet 2

INVENTOR.
GASPARAS KAZLAUSKAS
BY
AGENT

United States Patent Office 3,395,262
Patented July 30, 1968

3,395,262
EXTERNAL WELD HEAD
Gasparas Kazlauskas, Encino, Calif., assignor to North American Rockwell Corporation, a corporation of Delaware
Filed Sept. 30, 1964, Ser. No. 400,530
3 Claims. (Cl. 219—60)

ABSTRACT OF THE DISCLOSURE

An external weld head having a rotatable split gear positioned within a split housing and an electrical input to an electrode connected to at least one of the gear portions so that a constant weld current is provided to the electrode during rotation of the split gear. A controlled atmosphere is also provided to the housing and to a channel having a plurality of outlet apertures that cooperate with the electrode. The controlled atmosphere is ported from the housing through at least one suitable recess in the housing.

---

The present invention relates to weld heads and more particularly to a new and improved external weld head for external welding.

It is desirable in arc welding, particularly in welding tubing for closed loop systems, to maintain both a near constant welding current and a controlled atmosphere at the weld region. Both of these factors contribute to a high quality weld when they are closely controlled.

External weld heads suitable for welding tubing in closed loop systems generally use a split housing and a split gear arrangement. Where the weld head electrode is carried by the split gear, the problem arises of maintaining the near constant welding current at the electrode. Resistance heating at the mating faces of the split gear results in a substantial, if not total, loss of welding current, particularly when low amperage welding current is used. The loss of welding current at the electrode will extinguish the welding arc and result in a poor quality weld.

In addition to the close control of the welding current, the controlled atmosphere which is necessary for fusion welding processes, such as tungsten electrode welding, must totally bathe the weld region in a simple yet positive manner.

Accordingly, it is an object of the present invention to provide a new and improved external weld head for welding tubing and the like, particularly in closed loop systems.

Another object of the invention is to provide an external weld head which maintains a near constant welding current input to an electrode.

A further object of the invention is to provide an external weld head which maintains a controlled atmosphere at the weld region.

Briefly, in accordance with the invention, an external weld head is provided having an electrically conductive split gear with an electrode means connected to a portion of the split gear. The split gear is rotatably positioned within a split housing which also supports a welding current input means that diametrically engages the split gear so that as the gear is rotated a constant current is fed to the electrode means through the supporting gear portion. A controlled atmosphere within the housing is particularly directed to the weld region as desired.

Further objects, features and the attending advantages of the present invention will become apparent when the following description is read in conjunction with the drawings in which.

Figure 1:
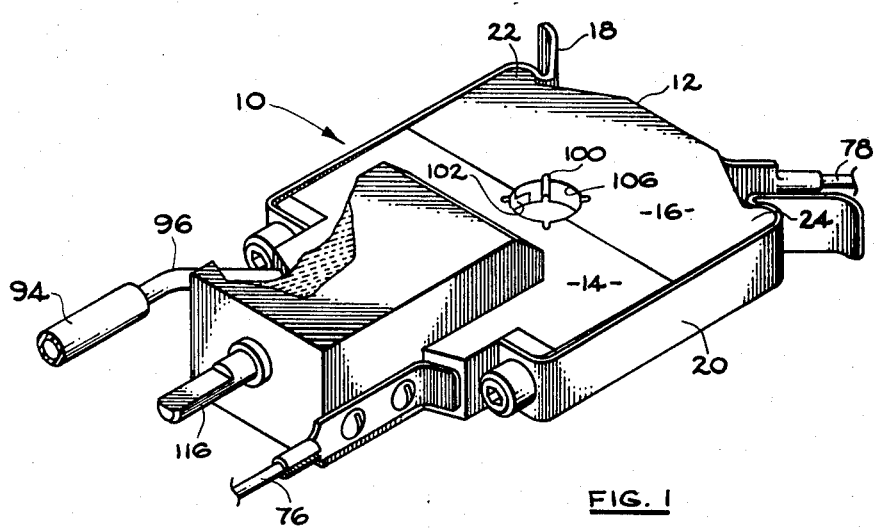
FIGURE 1 is a perspective view, partly broken away, of one form of external weld head of the invention.
Figure 2:
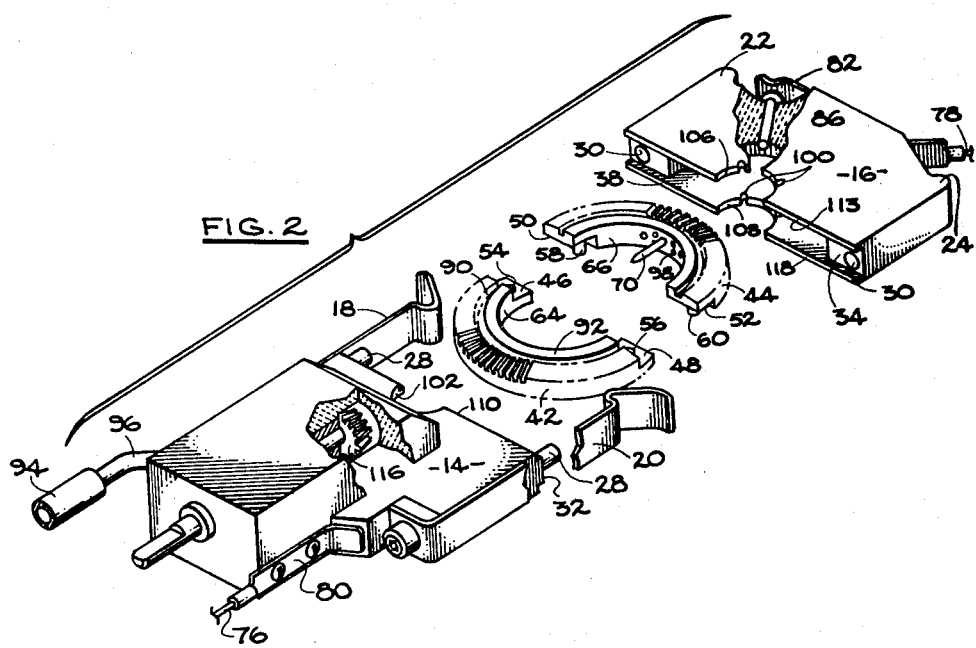
FIGURE 2 is an exploded perspective view of a portion of the weld head of FIGURE 1.
Figure 3:
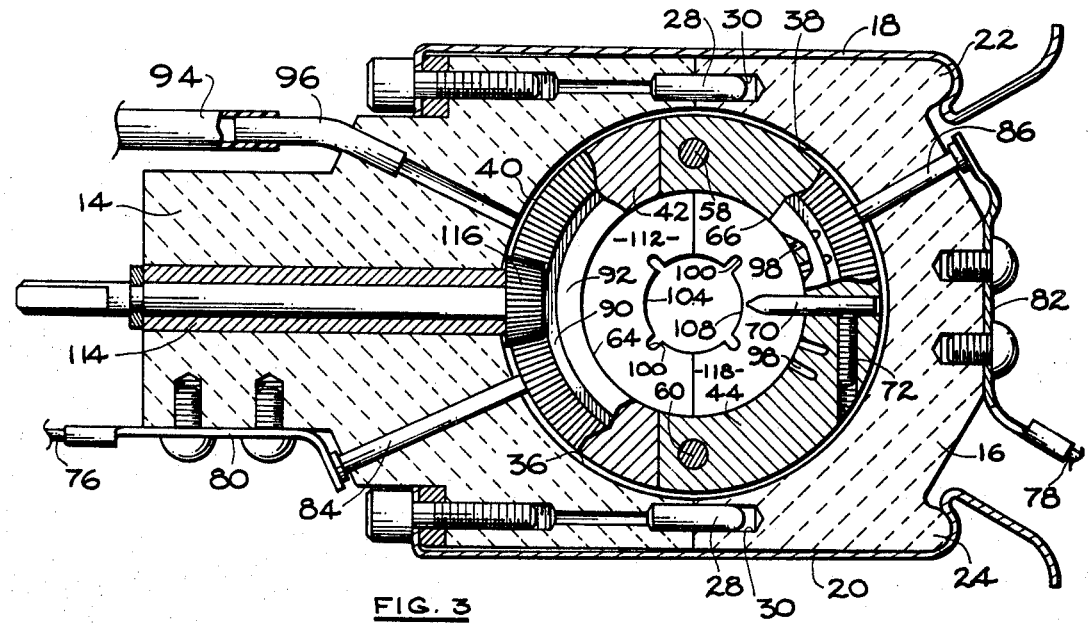
FIGURE 3 is a cross-section of a plan view of the external weld head of FIGURE 1.

Referring to the drawings described briefly above and particularly to FIGURES 1 through 3, the new and improved external weld head 10 of the invention has an assembled split housing 12 with separable housing portions 14 and 16.

The split housing 12 is electrically non-conductive and is preferably formed from a suitable refractory material such as boron nitride and the like. Separable portions 14 and 16 are clamped together by leaf spring latches 18 and 20. The latches 18 and 20 are secured at one end to housing portion 14 and engage respective projections 22 and 24 formed in housing portion 16. Alignment of the separable portions 14 and 16 is facilitated by similar guide pins 28 positioned in portion 14. The guide pins 28 are inserted into similar holes 30 in portion 16. Alignment of the split housing portions 14 and 16 can be further enhanced by a tongue and groove joint, with a tongue 32 on housing portion 14 and groove 34 on housing portion 16. These features insure a positive alignment of the separable housing portions 14 and 16 when clamped together by the leaf spring latches 18 and 20 to form the assembled split housing 12.

Each of the housing portions 14 and 16 have respective cavities 36 and 38 suitably formed therein. The cavities 36 and 38 receive a split gear means such as bevel gear 40 which is rotatably positioned therein when the housing portions 14 and 16 are assembled into the split housing 12. The split gear 40 is machined for a slide fit within the cavities 36 and 38 and freely rotates therein about a fixed axis in either a clockwise or counter clockwise direction when driven as hereinafter described.

The split gear 40 is electrically conductive and can be formed from a suitable copper alloy or the like. The gear 40 is assembled from gear portions 42 and 44. Each gear portion is preferably one-half of a full circle; however, it is contemplated that the split gear may be assembled from two or more gear portions with each portion having a different arc length. The gear portions 42 and 44 have stepped surfaces 46, 48, 50, and 52 which, when the gear portions are assembled, form lap joints. Stepped surfaces 46 and 48 have respective alignment holes 54 and 56 which receive dowels 58 and 60 depending from stepped surfaces 50 and 52, respectively.

Gear portions 42 and 44 have respective arcuate recesses 64 and 66 which define a central aperture in the assembled split gear 40. A welding electrode means such as electrode 70 extends radially inwardly from the surface of arcuate recess 66 of gear portion 44 into the split gear aperture. The electrode 70, which may be formed from 2% thoriated tungsten and the like, is adjustably secured in gear portion 44 by a conventional set screw 72 (see FIGURE 3) so that electrode 70 can be radially adjusted in the split gear aperture to accommodate a broad range of tubing diameters received therein.

A welding current from a conventional power supply (not shown) is fed in parallel through a welding current input means. The welding current passes through insulated electrical leads 76 and 78 to respective spring conductors 80 and 82. The spring conductors 80 and 82 are secured to the respective housing portions 14 and 16 and urge conductor brush-pins 84 and 86, respectively, into sliding engagement with the peripheral surface of the assembled split gear 40. The conductor brushes 84 and 86 are suitably positioned in respective housing portions 14 and 16 in a preferred diametric relationship as shown. When the split gear 40 is rotated as hereinafter described, a constant welding current is fed from a respective one of the parallel electrical leads through an associated conductor brush, which is in direct electrical contact with gear portion 44, to the gear portion and thus to the electrode 70 supported thereby.

Figure 4:
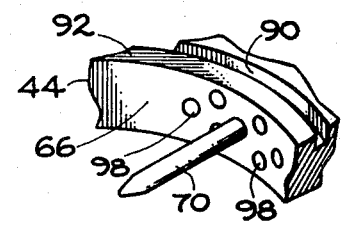
FIGURE 4 is an enlarged view of a fragmentary portion of FIGURE 2.

The gear portions 42 and 44 are suitably formed so that the assembled split gear 40 has a channel 90 to direct a controlled atmosphere when a weld cycle requires such an atmosphere. It is contemplated that in certain weld cycles, the use of a controlled atmosphere would not be required and would not be introduced to the weld region. The channel 90 is separated from the arcuate recesses 64 and 66 by a rim 92. An inlet hose 94 directs a controlled atmosphere, e.g. an inert gas such as helium, argon, and the like, from an external source (not shown) through an inlet pipe 96 connected to housing portion 14 into the internal cavities 36 and 38 of the split housing 12. The channel 90 further directs the inert gas to a plurality of similar outlet apertures 98 (see FIGURE 4) adjacent to the welding electrode 70 in gear portion 44. The apertures 98 direct the inert gas from the channel 90 to the immediate weld region at the electrode 70 and bathe the weld region in a controlled atmosphere.

The controlled atmosphere introduced to the weld region egresses from the split housing 12 through similar lobate recesses 100 formed in the semi-circular recesses 102, 104, 106, and 108 which are formed in the respective spaced-apart walls 110, 112, 113, and 118 of the housing portions 14 and 16. The semi-circular recesses define axially aligned and spaced apart apertures in the assembled split housing 12 which are preferably sized to align and secure tubing clamped therein with the split gear aperture for a welding operation. It is contemplated that either a singular lobate recess, or a plurality of notches, or the like can also be provided in the split housing 12 for the egress of the controlled atmosphere.

A pinion bushing 114 with a pinion gear and shaft 116 is retained by housing portion 14. Pinion 116 engages the assembled split gear 40 and rotates the split gear in a desired direction of rotation. Pinion 116 can be driven by a flexible cable (not shown) from a suitable drive motor (not shown), or the pinion can be driven by a direct drive motor, such as a DC drive motor, positioned on the housing portion 14. If desired, a conventional gear arrangement can interconnect the drive motor and pinion gear-shaft 116.

In one operating sequence, the split gear portions 42 and 44 are assembled about a tube joint to be welded. The electrode 70 is radially positioned with respect to the outer diameter of the tubing and secured by the set screw 72. The housing portions 14 and 16 are assembled around the split gear 40 and the electrode 70 is axially positioned. After the electrode 70 is axially positioned, the housing portions 14 and 16 are clamped together by the spring latches 18 and 20 so that the semi-circular recesses 102, 104, 106, and 108 securely grip the tubing walls. The assembled split housing 12 now accurately retains the electrode at the weld joint to be formed, and also securely clamps and aligns the tubing during the weld cycle. Inert gas introduced to the channel 90 exhausts through the outlet apertures 98 and effectively shields the weld region.

A constant welding current input to the electrode 70 is provided during the weld cycle through the parallel input leads 76 and 78. During rotation of the split gear 40 by the pinion 114, either conductor brush 84 or 86 is in direct electrical contact with gear portion 44 which supports the electrode 70. Welding current is fed at all times during rotation of the gear 40 to the electrode through the direct current flow path without resistance heating losses at the lap joint surfaces of the assembled gear. Throughout the weld cycle, the desired welding current potential remains constant to produce a high quality weld.

Figure 5:
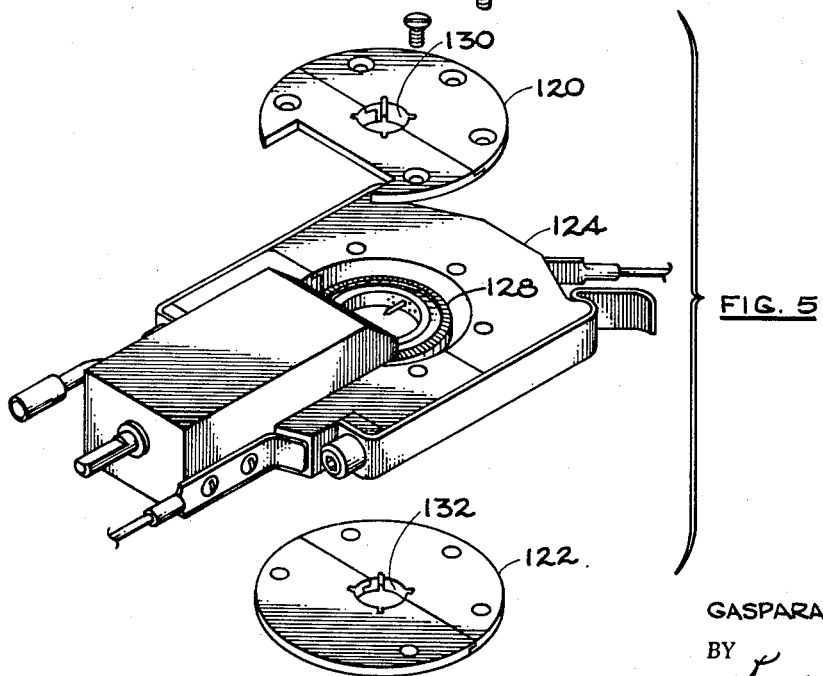
FIGURE 5 is an exploded perspective view of a modification of the external weld head of the invention.

One modification of the split housing as shown by FIGURE 5 has removable insert discs 120 and 122 secured to a split housing 124 by similar screws 126. Each of the insert discs has separable portions to facilitate positioning the split housing around an assembled split gear 128. The removable insert discs 120 and 122 permit the rapid adjustment of the split housing and thus the external weld head to various sizes and shapes of tubing. The central apertures, such as apertures 130 and 132 of discsc 120 and 122, can have dimensions and shapes as needed.

As will be evidenced from the foregoing description, certain aspects of the present invention are not limited to the particular details of construction as illustrated and described. It is contemplated that other modifications and applications will occur to those skilled in the art, and it is therefore intended that the appended claims shall cover such modifications and applications that do not depart from the true spirit and scope of the invention.

Having described my invention, what I desire to claim and secure by Letters Patent of the United States is:

1. An improved external weld head for fusion welding comprising:
   (a) an electrically conductive split gear having first and second gear portions separably joined,
   (b) each of said gear portions having adjoining arcuate recesses defining an aperture in said split gear,
   (c) an electrode adjustably connected to said first gear portion and extending generally radially inwardly into said split gear aperture from said first gear portion arcuate recess,
   (d) channel means in said split gear spaced from said split gear aperture,
   (e) a plurality of outlet apertures from said channel means adjacent said electrode,
   (f) an electrically non-conductive split housing rotatably positioning said split gear and having first and second housing portions separably joined,
   (g) each of said first and second housing members having spaced-apart walls with adjoining semi-circular recesses generally defining axially aligned apertures in said split housing,
   (h) at least one of said semi-circular recesses having at least one recess,
   (i) said split housing apertures substantially coinciding with said split gear aperture,
   (j) inert gas means connected to said split housing and providing a controlled atmosphere to said channel means,
   (k) drive means cooperating with said split housing and having a driving connection to said split gear for rotating said gear, and
   (l) respective ones of a pair of spring-loaded contact brushes circumferentially spaced about said split gear by said split housing in a substantially diametric relationship to each other and engaging said split gear so that a constant welding current is fed by respective ones of said brushes through said first gear portion to said electrode during rotation of said gear.

2. The improved weld head of claim 1 in which said contact brushes are electrically connected in parallel.

3. The improved weld head of claim 1 in which said one recess is a lobate recess.

References Cited

UNITED STATES PATENTS 3,194,936  7/1965  Rohrberg et al. _____ 219—60.1
3,194,937  7/1965  Brons et al. _____ 219—60.1

RICHARD M. WOOD, *Primary Examiner.*

B. A. STEIN, *Assistant Examiner.*